(12) United States Patent
Sato

(10) Patent No.: US 10,309,567 B2
(45) Date of Patent: Jun. 4, 2019

(54) PIPE FITTING

(71) Applicant: PIOLAX, INC., Yokohama-shi (JP)

(72) Inventor: Yoshie Sato, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 173 days.

(21) Appl. No.: 15/327,121

(22) PCT Filed: Jul. 10, 2015

(86) PCT No.: PCT/JP2015/069886
§ 371 (c)(1),
(2) Date: Jan. 18, 2017

(87) PCT Pub. No.: WO2016/013422
PCT Pub. Date: Jan. 28, 2016

(65) Prior Publication Data
US 2017/0152981 A1     Jun. 1, 2017

(30) Foreign Application Priority Data

Jul. 23, 2014 (JP) ................................ 2014-149810

(51) Int. Cl.
*F16L 21/08* (2006.01)
*F16L 37/12* (2006.01)
*F16L 37/098* (2006.01)

(52) U.S. Cl.
CPC ........... *F16L 37/1205* (2013.01); *F16L 21/08* (2013.01); *F16L 37/098* (2013.01)

(58) Field of Classification Search
CPC . F16L 37/1205; F16L 37/098; F16L 37/0985; F16L 21/08; F16L 37/0982
See application file for complete search history.

(56) References Cited

U.S. PATENT DOCUMENTS

| 4,948,176 A * | 8/1990 | Bartholomew ..... F16L 37/0982 |
|---|---|---|
| | | 285/319 |
| 5,100,182 A * | 3/1992 | Norkey ............... F16L 37/0982 |
| | | 285/318 |

(Continued)

FOREIGN PATENT DOCUMENTS

| DE | 10 2005 044 751 A1 | 4/2006 |
|---|---|---|
| JP | H 11-500817 A | 1/1999 |

(Continued)

OTHER PUBLICATIONS

International Search Report (ISR) (PCT Form PCT/ISA/210), in PCT/JP2015/069886, dated Oct. 13, 2015.

*Primary Examiner* — David Bochna
*Assistant Examiner* — James A Linford
(74) *Attorney, Agent, or Firm* — McGinn I.P. Law Group, PLLC

(57) ABSTRACT

Provided is a pipe fitting, which is capable of preventing unintended release of a connection between pipes due to an external manipulation and is capable of releasing the connection between the pipes when necessary. This pipe fitting has a housing, a first retainer, and a second retainer. The first retainer has first elastic pieces as well as being slidably disposed inside the housing and being configured so that when the first retainer is located on the connecting section side of the housing, the first elastic pieces are expandable and when the first retainer is located on the inserting section side of the housing, expansion of the first elastic pieces is restricted. An operating pipe section, which can be held at the connecting section end only through an opening in the connecting section of the housing is provided on the second retainer.

15 Claims, 10 Drawing Sheets

(56) References Cited

U.S. PATENT DOCUMENTS

| | | | | |
|---|---|---|---|---|
| 5,161,834 | A | * | 11/1992 | Norkey ............... F16L 37/0982 |
| | | | | 285/317 |
| 5,193,857 | A | * | 3/1993 | Kitamura .............. F16L 37/098 |
| | | | | 285/319 |
| 5,226,230 | A | | 7/1993 | Klinger |
| 6,068,303 | A | * | 5/2000 | Hollnagle ............... F16L 35/00 |
| | | | | 285/233 |
| 6,086,119 | A | | 7/2000 | Hänsel |
| 6,173,998 | B1 | | 1/2001 | Bock |

FOREIGN PATENT DOCUMENTS

| | | |
|---|---|---|
| JP | 2000-065273 A | 3/2000 |
| JP | 2000-320772 A | 11/2000 |

\* cited by examiner

PIPE FITTING

TECHNICAL FIELD

The present invention relates to pipe fittings for connecting pipe members such as hoses, tubes, and pipes.

For example, plural hoses and tubes are installed in internal combustion engine systems, braking systems, and fuel supply systems such as radiators in automobiles. Connectors are used in order to connect pipe members like these hoses and tubes. After connected, the connected pipe members sometimes need to be disconnected from each other because of maintenance or other reasons.

As an exemplary manner for connecting or disconnecting these pipe members, the following Patent Document 1 describes a fluid fitting that includes a socket main body including a connection portion for a hose at one end and a cavity portion into which a pipe member or the like is inserted at the other end, a valve element provided slidably in the socket main body, and a connection-target member retaining member (retainer) that is disposed in the cavity portion and arranged to retain the pipe member or the like.

The socket main body includes a window portion communicating with the cavity portion on the outer periphery on the other end side, and the window portion includes an engagement portion on its rim. The retainer has a cylindrical shape, and includes a pair of outer cylindrical portions that extend from part way in the axial direction to the one end side of the retainer, and each of the outer cylindrical portions includes an engagement projection on the inner surface that is engaged with and disengaged from an engagement portion of the socket main body. The retainer includes a concave portion, to which an annular projection of the pipe member is fitted, on the inner surface at the other end portion.

When the retainer is disposed in the cavity portion of the socket main body, the pair of outer cylindrical portions of the retainer protrude from the window portion of the socket main body, and the engagement projections of the outer cylindrical portions are engaged with the engagement portion of the socket main body, whereby the retainer is mounted on the socket main body. By inserting the pipe member into the cavity portion of the socket main body in this state, the annular projection of the pipe member is fitted to the concave portion of the retainer, whereby the pipe member is connected with the hose via the fluid fitting.

By moving the pipe member in the direction of being pulled out of the cavity portion of the socket main body while the pair of outer cylindrical portions of the retainer is pushed in toward the engagement portion on the socket main body side, the space between the pair of the outer cylindrical portions of the retainer is enlarged, allowing the pipe member to be pulled out (see paragraph 0044).

CITATION LIST

Patent Literature

PATENT DOCUMENT 1: JP-2000-320772-A

SUMMARY OF THE INVENTION

Problem that the Invention is to Solve

Fittings as described above are often used, for example, in internal combustion engine systems and fuel supply systems of vehicles. In these cases, when the pipe member is pulled out by a user of the vehicle or the like when the user manipulates the pair of outer cylindrical portions of the retainer, exhaust gas components or fuel inconveniently leaks to the outside. On the other hand, the connected pipe members need to be disconnected from each other as necessary at the time of maintenance or component replacement in manufacturers or repair plants.

Thus, an object of the present invention is to provide a pipe fitting that is capable of reliably preventing connected pipe members from being inadvertently disconnected from each other by external manipulation, and is also capable of disconnecting connected pipe members from each other as necessary.

Means for Solving the Problem

In order to achieve the object described above, one aspect of the present invention provides a pipe fitting for connecting a first pipe member with a second pipe member, the first pipe member having a flange portion on its outer periphery, the pipe fitting including:

a cylindrical-shaped housing including:

a connection portion at its one end, the second pipe member to be connected with the connection portion; and an insertion portion at its other end, the first pipe member to be inserted into an inner periphery of the insertion portion; and a retainer mounted on the housing and arranged to retain the first pipe member, wherein the retainer includes at least one pair of first elastic piece extending toward an opening of the insertion portion of the housing, and having pawl portions engageable with the flange portion of the first pipe member, and is disposed inside the housing so as to be slidable only within a predetermined range in an axial direction, wherein the first elastic piece are expandable when the retainer is disposed on a connection portion side within the predetermined range in the axial direction inside the housing while expansion of the first elastic piece is regulated when the retainer is disposed on an insertion portion side within the predetermined range in the axial direction inside the housing, and wherein the retainer includes a manipulation construction that is manipulatable only through an opening of the connection portion of the housing to thereby allow the retainer to be held at the connection portion side.

The present invention may provide the pipe fitting, wherein a gap between the housing and the retainer is sealed with a first seal ring, and a gap between the retainer and the first pipe member is sealed with a second seal ring.

The present invention may provide the pipe fitting, wherein the retainer includes a first retainer disposed on the insertion portion side of the housing and provided with the first elastic piece, and a second retainer disposed on the connection portion side of the housing and provided with the manipulation construction, and wherein the first retainer is separated from the second retainer in a normal state, and is connectable with second retainer when the second retainer is manipulated to slide with the use of the manipulation construction.

The present invention may provide the pipe fitting, wherein the second retainer includes a second elastic piece that is bendable and engageable with the first retainer, and wherein bending of the second elastic piece is regulated by an interior wall of the housing in the normal state, and the second elastic piece is bent to get engaged with the first retainer when the second retainer is pushed in toward the first retainer with the use of the manipulation construction.

The present invention may provide the pipe fitting, wherein the manipulation construction of the retainer is configured to be engageable with a manipulation tool when the manipulation tool is inserted into the housing through the opening on the connection portion side of the housing.

The present invention may provide the pipe fitting, wherein the retainer includes a manipulation portion that extends beyond the connection portion of the housing to thereby function as the manipulation construction.

Advantageous Effects of Invention

With the pipe fitting according to the present invention, when the first pipe member is inserted into the inner periphery of the insertion portion of the housing in a state where the retainer is mounted on the housing, the retainer moves to the connection portion side to expand the first elastic pieces, whereby the pawl portions of the first elastic pieces are engaged with the flange portion of the first pipe member. Thus, the first pipe member can be connected with the second pipe member.

When the first pipe member is pulled in a pull-out direction in this state, the retainer moves to the insertion portion side to regulate the expansion of the first elastic pieces. Thus, the pawl portions of the first elastic pieces are not disengaged from the flange portion of the first pipe member, which allows the connected state to be kept.

Because the retainer is configured not to be manipulated from outside in the state where the first pipe member is connected with the second pipe member, the first pipe member cannot be pulled in the pull-out direction in a state where the retainer is moved toward and held at the side of the connection portion. Thus, the connected first pipe member and second pipe member can be reliably prevented from being disconnected from each other by inadvertent manipulation from the outside.

When the connected first pipe member and second pipe member need to be disconnected from each other because of maintenance or other reasons, the first elastic pieces are brought into an expandable state by moving and holding the retainer toward the connection portion through the opening of the connection portion of the housing with the use of the manipulation construction, for example, by cutting the second pipe member connected with the connection portion of the housing, and the first pipe member is pulled in the pull-out direction, whereby the pawl portions of the first elastic pieces can be disengaged from the flange portion of the first pipe member. Thus, the connected first pipe member and second pipe member can be disconnected from each other.

BRIEF DESCRIPTION OF THE DRAWINGS

FIG. 4A is a cross-sectional view of the pipe fitting. FIG. 4B is a cross-sectional view of the pipe fitting that is orthogonal at 90 degrees to FIG. 4A.

FIG. 5A is a cross-sectional view of the pipe fitting. FIG. 5B is a cross-sectional view of the pipe fitting that is orthogonal at 90 degrees to FIG. 5A.

FIG. 6A is a cross-sectional view of the pipe fitting. FIG. 6B is a cross-sectional view of the pipe fitting that is orthogonal at 90 degrees to FIG. 6A.

FIG. 7A is a cross-sectional view of the pipe fitting. FIG. 7B is a cross-sectional view of the pipe fitting that is orthogonal at 90 degrees to FIG. 7A.

FIG. 8A is a cross-sectional view of the pipe fitting. FIG. 8B is a cross-sectional view of the pipe fitting that is orthogonal at 90 degrees to FIG. 8A.

FIG. 9A is a cross-sectional view of the pipe fitting. FIG. 9B is a cross-sectional view of the pipe fitting that is orthogonal at 90 degrees to FIG. 9A.

MODE FOR CARRYING OUT THE INVENTION

Hereinafter, the pipe fitting according to one embodiment of the present invention will be described referring to FIGS. 1 to 9B.

Figure 1:
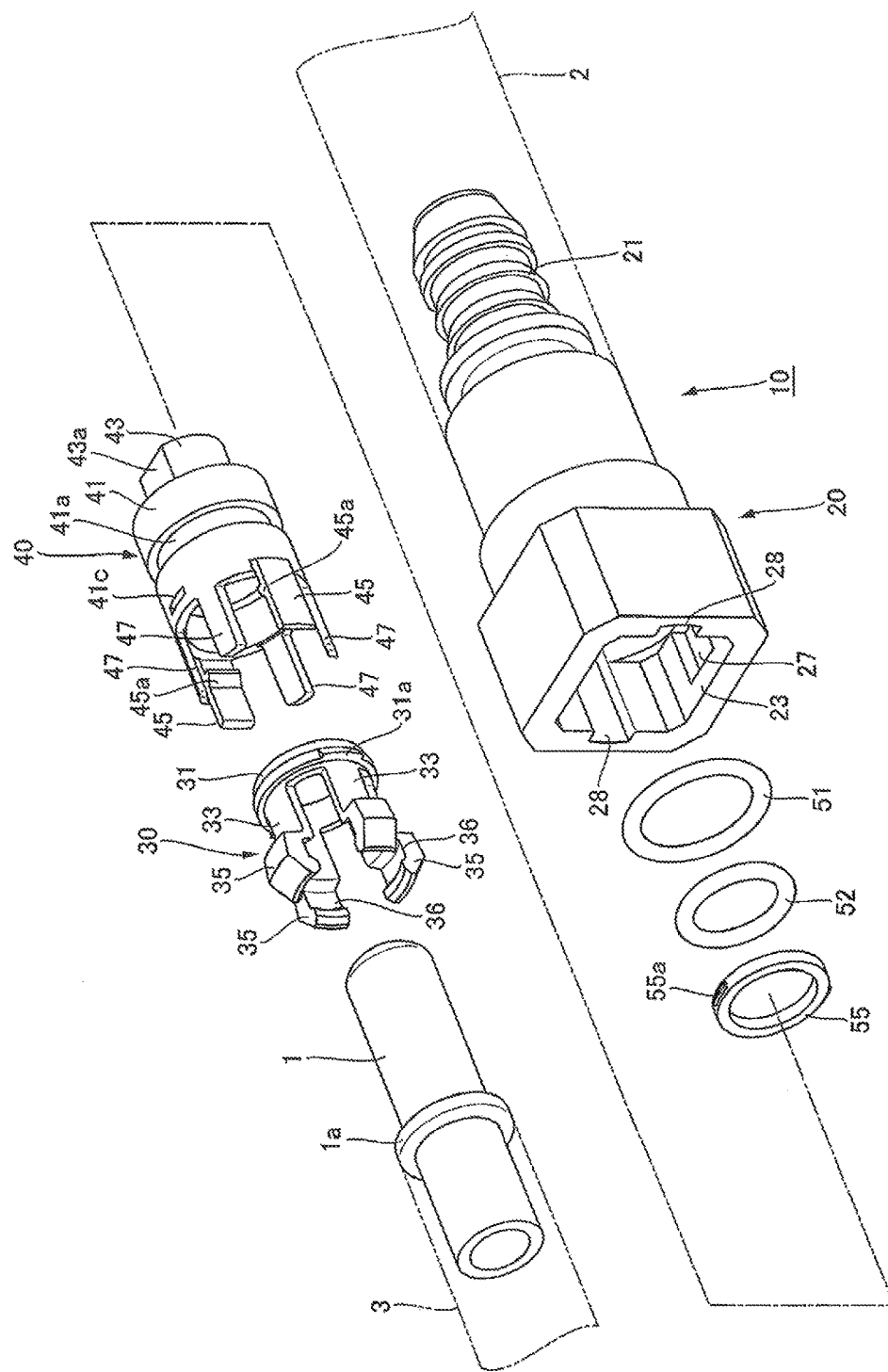
FIG. 1 is an exploded perspective view of a pipe fitting according to one embodiment of the present invention.

As shown in FIG. 1, a pipe fitting 10 according to the present embodiment is for connecting a first pipe member 1 including a flange portion 1a having an annular shape on its outer periphery with a second pipe member 2. In the present embodiment, a third pipe fitting 3 is further connected with the outer periphery of the first pipe member 1.

Examples of pipe members that are connected together via the pipe fitting 10 include hoses, tubes, and pipes that are used in internal combustion engine systems, braking systems, or fuel supply systems such as radiators in automobiles. Pipe members other than the above-described pipe members may be used.

As shown in FIG. 1, the pipe fitting 10 according to the present embodiment includes a housing 20 having a cylindrical shape, a first retainer 30 disposed so as to be slidable inside the housing 20 and arranged to retain the first pipe member 1, and a second retainer 40 arranged to be engaged with and disengaged from the first retainer 30 and disposed so as to be slidable inside the housing 20. In the present embodiment, the first retainer 30 and the second retainer 40 constitute the "retainer" of the present invention.

Figure 2:
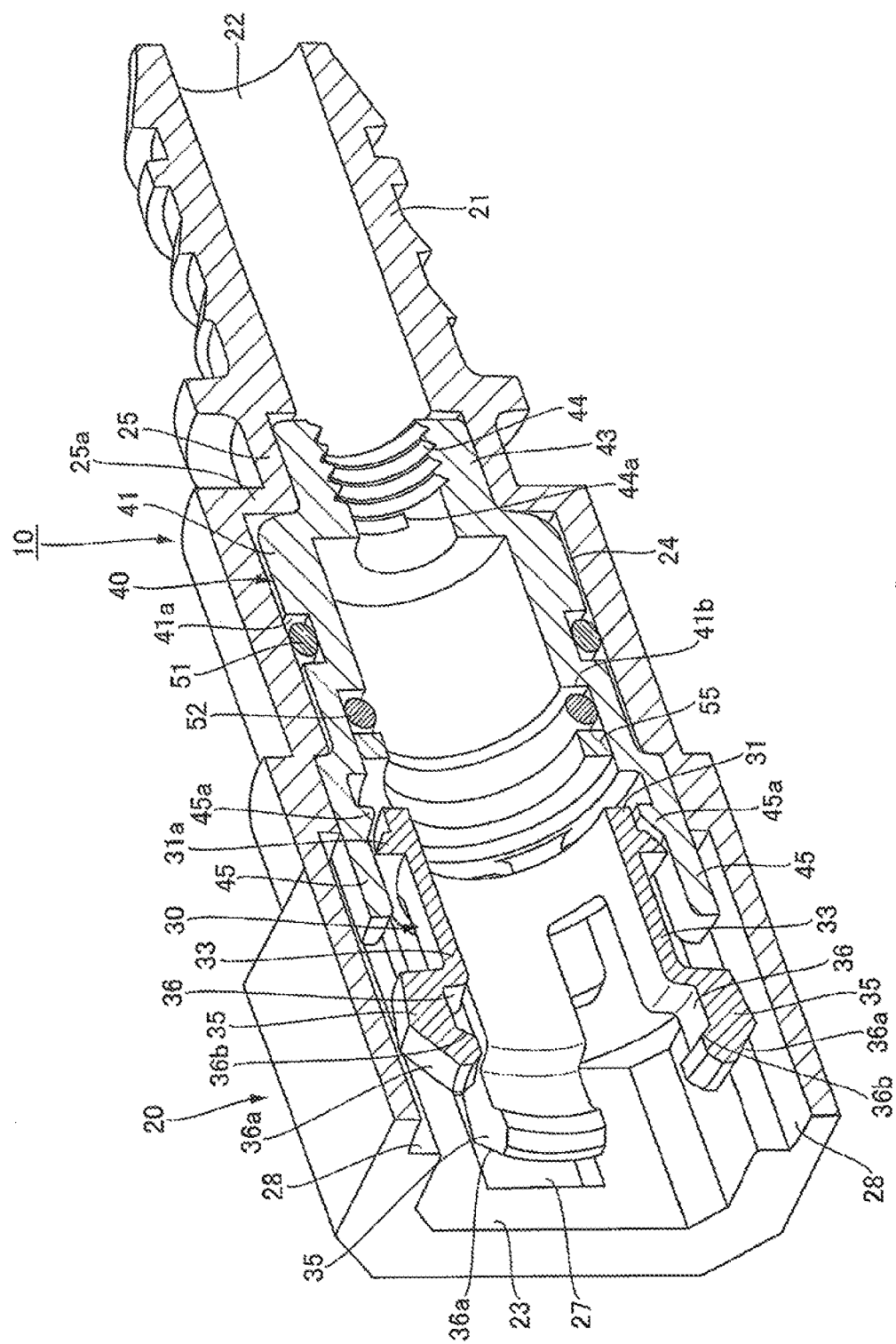
FIG. 2 is a cross-sectional perspective view of relevant components of the pipe fitting.
Figure 3:
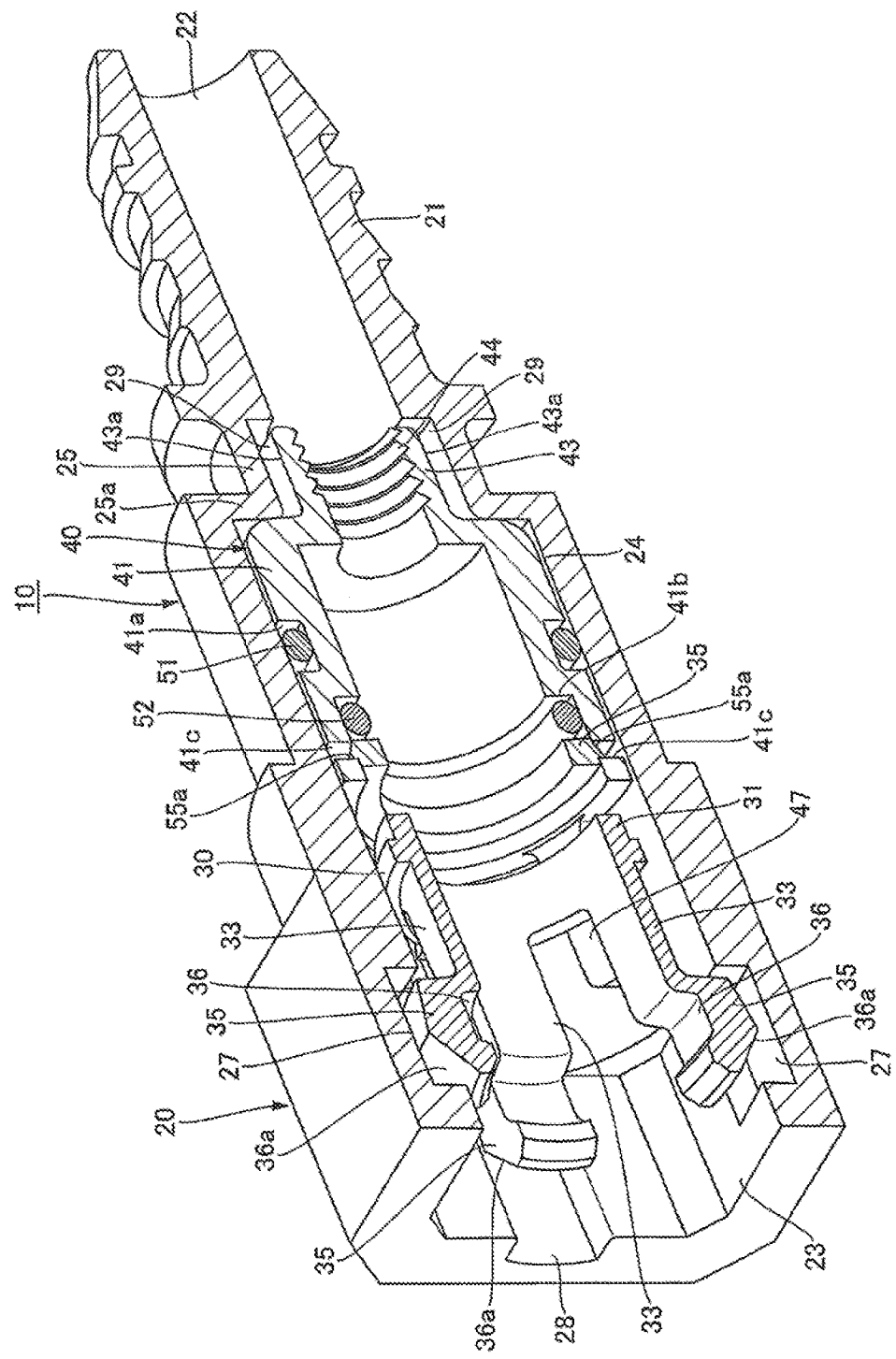
FIG. 3 is a cross-sectional perspective view of relevant components of the pipe fitting seen from a direction different from FIG. 2, the direction being orthogonal at 90 degrees to FIG. 2.

As shown in FIGS. 1 to 3, the housing 20 has an approximately circular cylindrical shape of extending a predetermined length and being opened at both the ends in the axial direction. The housing 20 includes a connection portion 21 at its one end with which the second pipe member 2 is connected, and an insertion portion 23 at the other end into which the first pipe member 1 is inserted. While having an approximately square rectangular cylindrical shape in the present embodiment, the insertion portion 23 may have a circular cylindrical shape or an elliptical shape, which is not particularly limited.

As shown in FIGS. 2 and 3, the interior of the housing 20 has the shape of being reduced in diameter stepwisely from the opening side of the insertion portion 23. A ring placement portion 24 is provided in the recess of the housing 20, and a reduced-diameter cylindrical portion 25 that is reduced in diameter more than the ring placement portion 24 is provided in the recess deeper than the ring placement portion 24 via a step portion 25*a*. A manipulation cylindrical portion 43 of the second retainer 40 (see FIGS. 2 and 3) is inserted to be disposed in the reduced-diameter cylindrical portion 25 so as to be slidable only within a predetermined range in the axial direction. A first seal ring 51 is disposed in the ring placement portion 24.

Figure 4A:
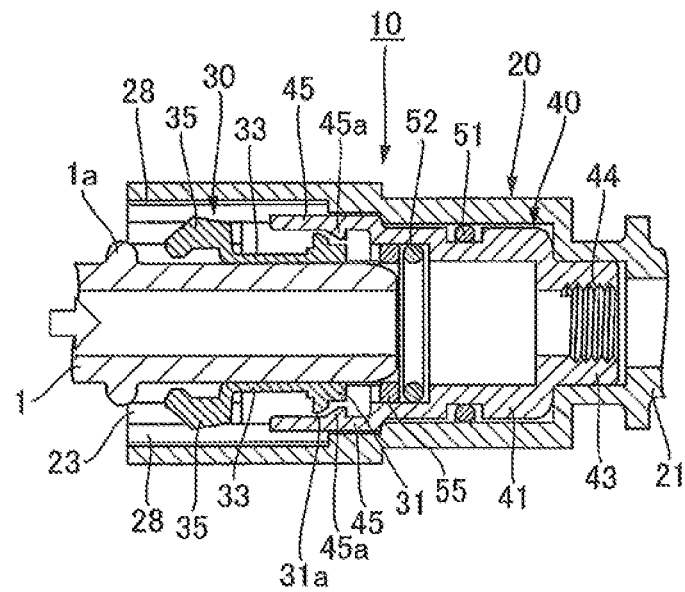
FIGS. 4A and 4B are views of the pipe fitting showing a first usage state thereof.
Figure 4B:
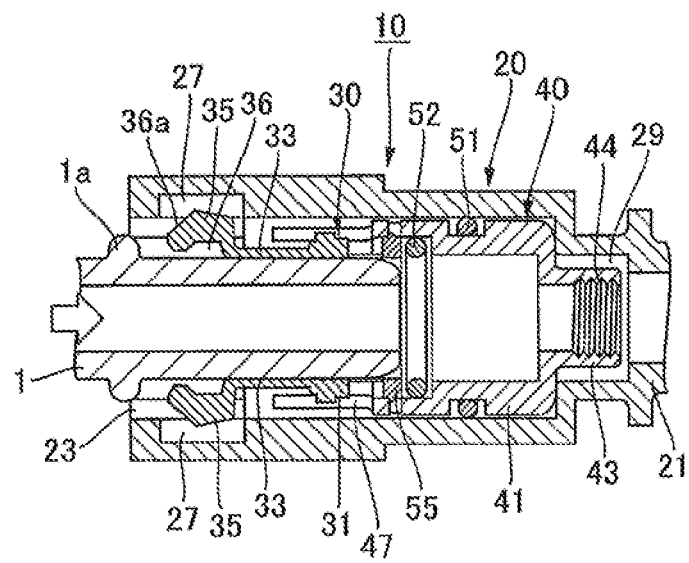

As shown in FIGS. 3 and 4B, a pair of engagement concave portions 27 and 27 are provided to inner peripheries of opposed wall portions of the insertion portion 23 having a square cylindrical shape. The engagement concave portions 27 and 27 have a rectangular concave shape extending long along the axial direction of the housing 20, into which pawl portions 35 of first elastic pieces 33 of the first retainer 30 (see FIG. 3) to be described later slidably get.

As shown in FIGS. 2 and 4A, a pair of slide grooves 28 and 28 are provided to inner peripheries of wall portions of the insertion portion 23 of the housing 20 at the positions orthogonal to the pair of engagement concave portions 27 and 27. The slide grooves 28 and 28 extend a predetermined length along the axial direction of the housing 20 from the end face on the opening side of the insertion portion 23. Each slide groove 28 has a groove shape opened on the interior space side of the housing 20 and on the opening side of the insertion portion 23, and a pair of first elastic pieces 33 and 33 of the first retainer 30 (see FIG. 2) to be described later are disposed so as to be slidable only within a predetermined range in the axial direction inside the housing 20.

In the housing 20 having the above-described structure, the first retainer 30 is disposed on the side of the insertion portion 23, and the second retainer 40 is disposed on the side of the connection portion 21 (see FIGS. 2 and 3).

Hereinafter, the first retainer 30 will be specifically described.

As shown in FIG. 1, the first retainer 30 includes a base portion 31 having an annular shape. The base portion 31 includes engagement projections 31*a* and 31*a* having a tapered surface gradually reduced in height toward the distal end and projecting from the outer surfaces of the base portion 31 that are opposed to each other in the circumferential direction. The engagement projections 31*a* define portions to be engaged with engagement protrusions 45*a* of second elastic pieces 45 of the second retainer 40 (see FIG. 2) to be described later (see FIG. 7A). One piece of engagement protrusion 31*a* may be used, and the number of the engagement protrusion 31*a* is not particularly limited.

The first retainer 30 includes at least one pair of first elastic pieces 33 that is bendable, extend toward the opening of the insertion portion 23 of the housing 20, and include pawl portions 35 to be engaged with the flange portion 1*a* of the first pipe member 1.

In the present embodiment, a pair of first elastic pieces 33 and 33 are provided extending from the positions opposed to each other in the circumferential direction on the end face on the base end side of the base portion 31, and another pair of first elastic pieces 33 and 33 are provided extending so as to be orthogonal to the pair of first elastic pieces 33 and 33 (four pieces in total). While two pairs of first elastic pieces 33 and 33 are provided in the present embodiment, three or more pairs of first elastic pieces 33 and 33 may be provided.

The pawl portion 35 to be engaged with the flange portion 1*a* of the first pipe member 1 is provided at the distal end of each first elastic piece 33. The pawl portions 35 in the present embodiment jut out in the radial outer direction of the first elastic pieces 33 and have a frame shape like an approximately square U shape including concave portions 36 on the inside diameter side as shown in FIGS. 2 and 3. The pawl portions 35 include outer tapered surfaces 36*a* at the distal ends on the outer side, and the outer tapered surfaces 36*a* are gradually reduced in height toward the distal ends in the extending direction of the first elastic pieces 33. The concave portions 36 include inner tapered surfaces 36*b* at the distal ends on the inner side, and the inner tapered surfaces 36*b* are gradually increased in height toward the distal ends. The shape of the pawl portions 35 is one example, and is not particularly limited only if the pawl portions 35 can be engaged with the flange portion 1*a* of the first pipe member 1.

In the present embodiment, the pawl portions 35 and 35 of one pair of first elastic pieces 33 and 33 among the four first elastic pieces 33 slidably get into the engagement concave portions 27 and 27 of the housing 20 while the pawl portions 35 and 35 of the other pair of first elastic pieces 33 and 33 slidably get into the slide grooves 28 and 28 of the housing 20 (see FIGS. 2 and 3).

The first retainer 30 is separated from the second retainer 40 in a normal state (a state where the second retainer 40 is not pushed in toward the first retainer 30) as shown in FIGS. 2, and 4 to 6 while made connectable with second retainer 40 by sliding the second retainer 40 toward the insertion portion 23 of the housing 20 with the use of a manipulation construction to be described later (see FIGS. 7A and 7B).

Figure 6A:
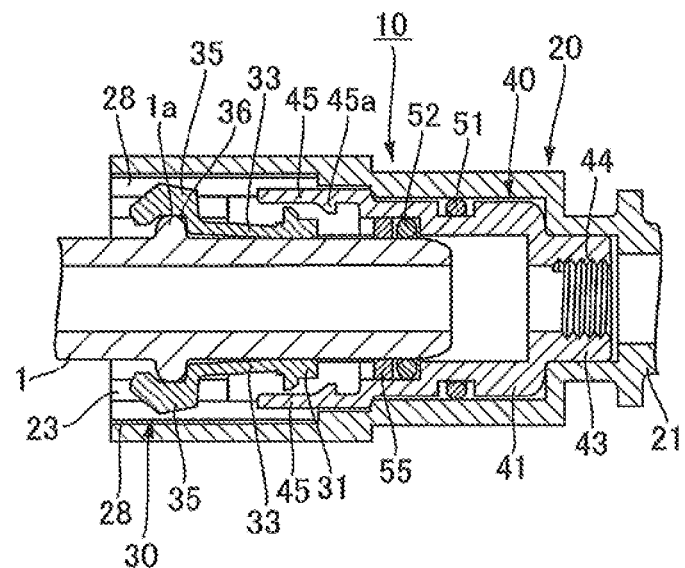
FIGS. 6A and 6B are views of the pipe fitting showing a third usage state thereof.
Figure 6B:
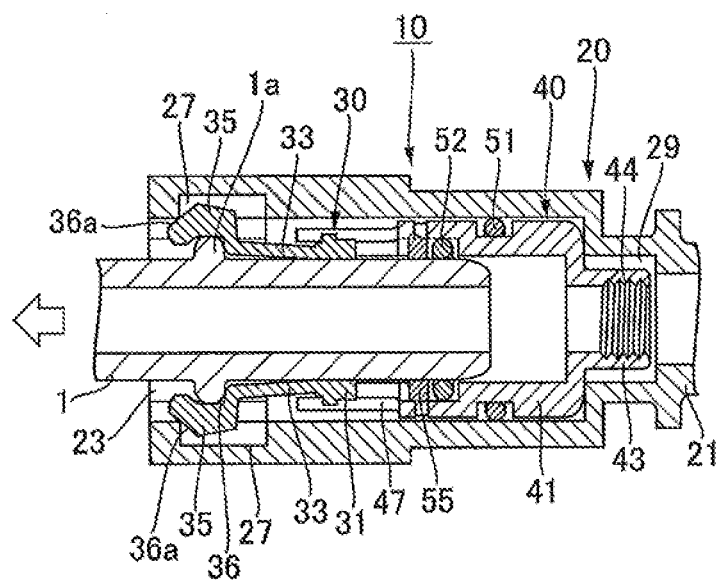

The first elastic pieces 33 are expandable when the first retainer 30 is disposed on the side of the connection portion 21 of the housing 20 (see FIGS. 8A and 8B) while expansion of the first elastic pieces 33 is regulated when the first retainer 30 is disposed on the side of the insertion portion 23 of the housing 20 (see FIGS. 6A and 6B).

To be specific, as shown in FIGS. 6A and 6B, when the first pipe member 1 is moved in a pull-out direction in a state where the pawl portions 35 are engaged with the flange portion 1*a* of the first pipe member 1, and the first retainer 30 is pulled toward the insertion portion 23 of the housing 20, the outer tapered surfaces 36*a* of the pawl portions 35 are engaged with the rims of the engagement concave portions 27 on the side of the insertion portion 23 (see FIG. 6B), whereby expansion of the first elastic pieces 33 is regulated.

Figure 8A:
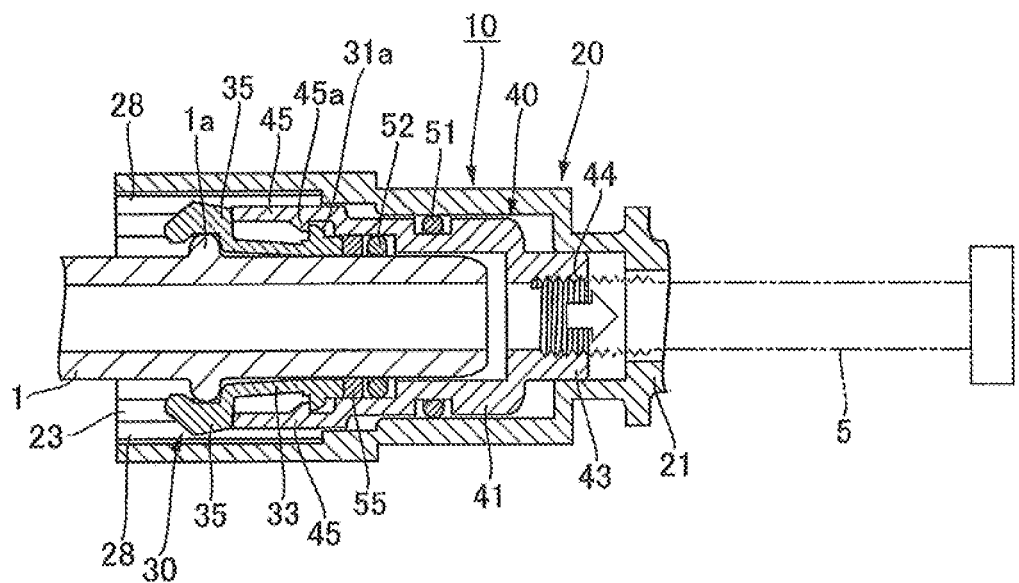
FIGS. 8A and 8B are views of the pipe fitting showing a fifth usage state thereof.
Figure 8B:
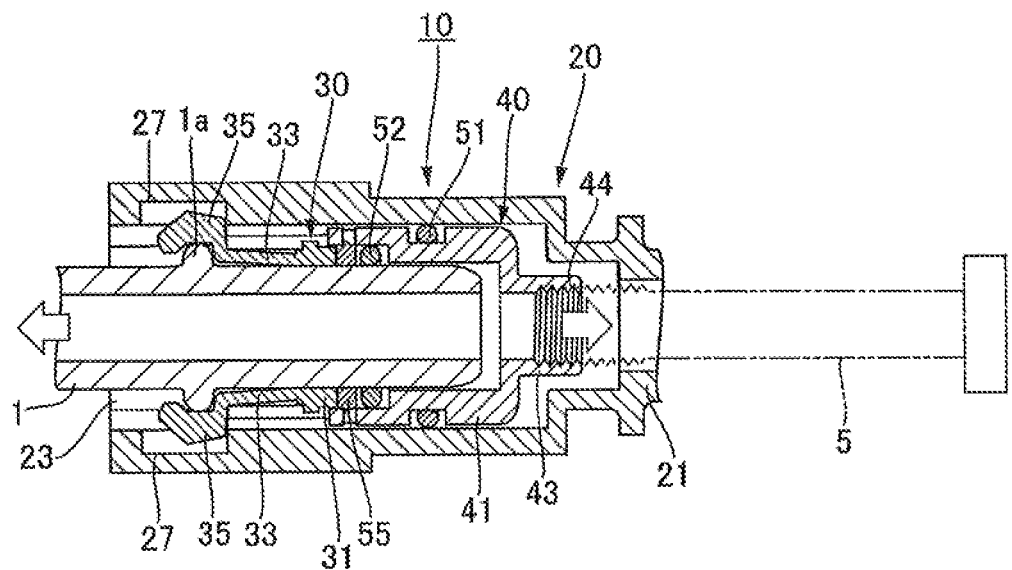

As shown in FIGS. 8A and 8B, the outer tapered surfaces 36*a* are not engaged with the rims of the engagement concave portions 27 while the base portion sides of the pawl portions 35 are in contact with the rims of the engagement concave portions 27 on the side of the connection portion 21 in a state where the second retainer 40 is pulled toward the connection portion 21 of the housing 20 and the first retainer 30 is kept at the side of the connection portion 21 of the housing 20 while the first retainer 30 is connected with the second retainer 40 (see FIG. 8B). Thus, by moving the first pipe member 1 in the pull-out direction while keeping the above-described state, the first elastic pieces 33 are made expandable (see FIGS. 9A and 9B).

Next, the second retainer 40 arranged to be engaged with and disengaged from the first retainer 30 and disposed so as to be slidable on the side of the connection portion 21 of the housing 20 will be described.

As shown in FIG. 1, the second retainer 40 has a main body 41 having an approximately circular cylindrical shape. The main body 41 includes a ring mounting groove 41a having an annular shape in the approximate middle of the axial direction, on which the first seal ring 51 is mounted. The gap between the inner periphery of the housing 20 and the outer periphery of the second retainer 40 is sealed with the first seal ring 51 (see FIGS. 2 and 3). As shown in FIG. 2, the main body 41 includes a ring placement portion 41b having a step shape part way on the inner periphery, on which the second seal ring 52 is disposed, whereby the gap between the inner periphery of the second retainer 40 and the outer periphery of the first pipe member 1 is sealed with the second seal ring 52 (see FIGS. 2, 3, 5A, and 5B).

Stopper engagement holes 41c and 41c are provided to the main body 41 at positions opposed to each other on its base end side as shown in FIGS. 1 and 3. A stopper ring 55 is disposed in the ring placement portion 41b, and a pair of engagement projections 55a and 55a projecting from the outer periphery of the stopper ring 55 are engaged with the pair of stopper engagement holes 41c and 41c, whereby the stopper ring 55 is positioned to retain the second seal ring 52.

The manipulation cylindrical portion 43 having a cylindrical shape of being reduced in diameter more than the main body 41 extends from the distal end of the main body 41 as shown in FIGS. 1 to 3. The manipulation cylindrical portion 43 is disposed so as to be slidable in the reduced-diameter cylindrical portion 25 of the housing 20 (see FIGS. 6A to 8B). Flat portions 43a and 43a that are parallel to each other are provided to the manipulation cylindrical portion 43 at positions opposed to each other on the outer periphery as shown in FIGS. 1 and 3, and the manipulation cylindrical portion 43 is disposed in the reduced-diameter cylindrical portion 25 via a predetermined gap 29 (see FIG. 3).

A thread groove 44 is further provided to the manipulation cylindrical portion 43 on its inner periphery. The distal end of the manipulation tool 5 (see FIGS. 7A and 7B) such as a screw driver is inserted from the opening 22 of the connection portion 21 of the housing 20, and is screwed into the thread groove 44 of the manipulation cylindrical portion 43, whereby the manipulation tool 5 is connected with the second retainer 40. Thus, the second retainer 40 can be manipulated with the use of the manipulation tool 5 so as to be slidable only within a predetermined range in the axial direction inside the housing 20 (see FIGS. 7A to 8B). A terminal portion 44a of the thread groove 44 is provided part way in the axial direction of the manipulation cylindrical portion 43 on the inner periphery as shown in FIG. 2, whereby the screwing amount of the distal end of the manipulation tool 5 into the manipulation cylindrical portion 43 is regulated.

A pair of second elastic pieces 45 and 45 are bendable and extend from the outer periphery of the base end of the main body 41 of the second retainer 40 with being opposed to each other as shown in FIGS. 1 and 2. An engagement protrusion 45a including a tapered surface gradually reduced in height toward the distal end in the extending direction protrudes from the inner surface part way in the axial direction of each second elastic piece 45.

The base ends of the second elastic pieces 45 are in contact with the interior wall of the housing 20, whereby the bending of the second elastic pieces 45 is regulated in a normal state (see FIGS. 2 and 4A). When the second retainer 40 is pushed in toward the first retainer 30 with the use of the manipulation cylindrical portion 43 and the manipulation tool 5 screwed into the manipulation cylindrical portion 43, the base ends of the second elastic pieces 45 are separated from the interior wall of the housing 20, which makes the second elastic pieces 45 bendable, and the engagement protrusions 45a of the second elastic pieces 45 get engaged with the engagement projections 31a of the base portion 31 of the first retainer 30, whereby the second retainer 40 can be connected with the first retainer 30 (see FIG. 7A).

Plural guide pieces 47 (four pieces in the present embodiment) extend from the end face on the base end side of the main body 41 of the second retainer 40 as shown in FIG. 1. The guide pieces 47 enter between the adjacent first elastic pieces 33 and 33 of the first retainer 30, and function as slide guides when the second retainer 40 and the first retainer 30 slide inside the housing 20.

Figure 10:
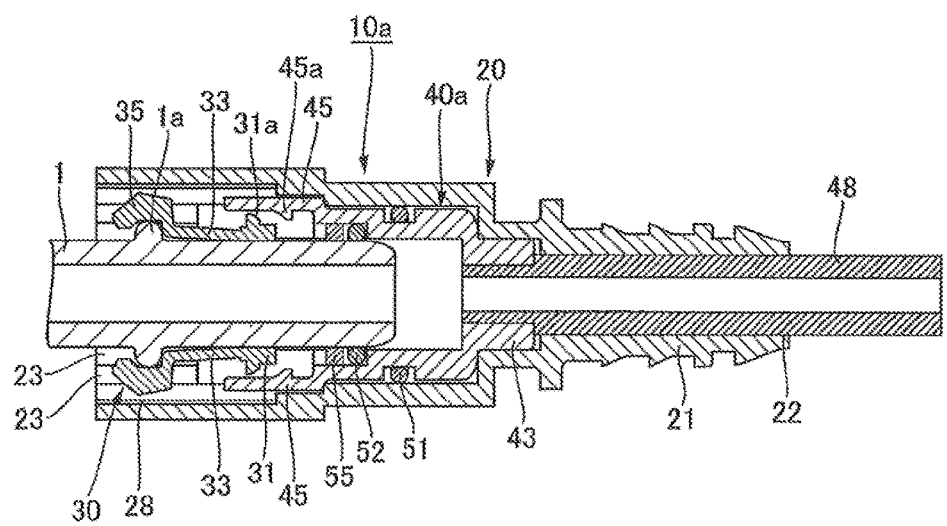
FIG. 10 is a cross-sectional view of a pipe fitting according to another embodiment of the present invention.

Thus, the pipe fitting 10 has a configuration that the second retainer 40 and the first retainer 30 that is connected with the second retainer 40 can be slid only within the predetermined range in the axial direction inside the housing 20 only through the opening 22 of the connection portion 21 of the housing 20 by screwing the manipulation tool 5 into the thread groove 44 of the manipulation cylindrical portion 43 as described above, and the second retainer 40 and the first retainer 30 can be held at the side of the connection portion 21 of the housing 20 by pulling the second retainer 40 toward the connection portion 21 of the housing 20 with the use of the manipulation tool 5 and the manipulation cylindrical portion 43. That is, the manipulation cylindrical portion 43 in the present embodiment defines the "manipulation construction" of the present invention. The manipulation construction is not limited to the manipulation cylindrical portion 43 including the thread groove 44, as long as the manipulation construction is configured to be manipulatable so as to allow the retainer to be held at the side of the connection portion 21 only through the opening 22 of the connection portion 21 of the housing 20. The manipulation construction may have the configuration as shown in FIG. 10 (to be described later).

While the "retainer" includes the first retainer 30 and the second retainer 40 in this embodiment, the "retainer" may be one retainer.

Next, one example of how to use the pipe fitting 10 having the above-described configuration will be described.

In the pipe fitting 10, the first retainer 30 is separated from the second retainer 40 in a normal state (a state where the second retainer 40 is not pushed in toward the first retainer 30), and the first retainer 30 is disposed on the side of the insertion portion 23 of the housing 20 while the second retainer 40 is disposed on the side of the connection portion 21 as shown in FIGS. 2 to 4B. The outer surfaces of the base ends of the second elastic pieces 45 of the second retainer 40 are in contact with the inner periphery of the housing 20, whereby the outward bending of the second elastic pieces 45 is regulated.

Figure 5A:
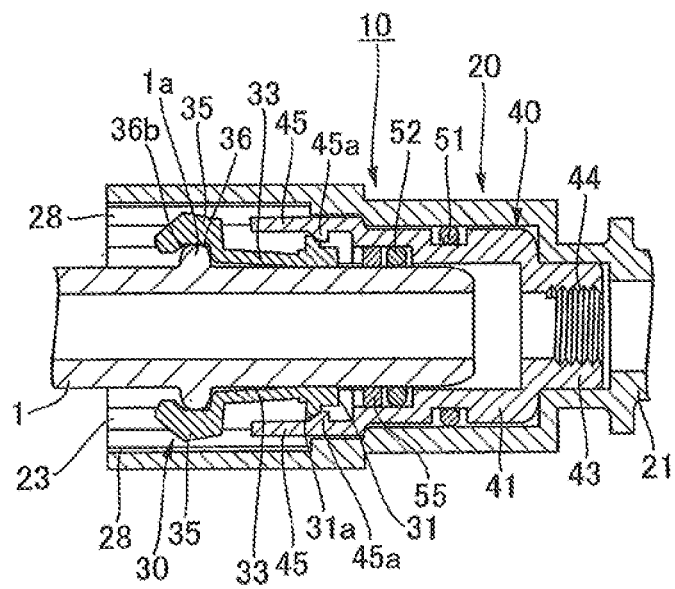
FIGS. 5A and 5B are views of the pipe fitting showing a second usage state thereof.

Then, when the distal end of the first pipe member 1 is inserted to be pushed in the opening of the insertion portion 23 of the housing 20 as shown in FIGS. 4A and 4B, the flange portion 1a of the first pipe member 1 is brought into contact with the distal ends of the pawl portions 35 of the first elastic pieces 33 of the first retainer 30, and the first retainer 30 is pushed in toward the connection portion 21 of the housing 20. Then, the engagement projections 31a and 31a of the base portion 31 of the first retainer 30 are brought into contact with the engagement protrusions 45a and 45a of the second elastic pieces 45 of the second retainer 40 as shown in FIG. 5A. At this time, since expansion of the second elastic pieces 45 and 45 of the second retainer 40 is regulated as described above, the first retainer 30 can be prevented from being further pushed in.

Figure 5B:
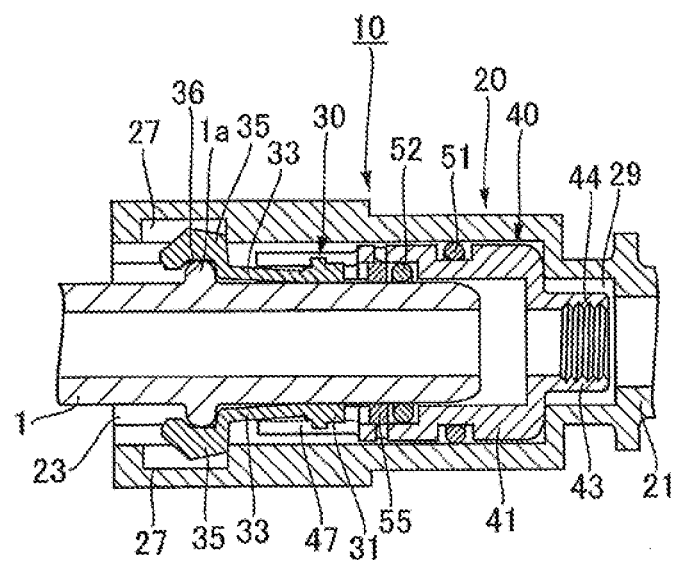

When the first pipe member 1 is further pushed in, the flange portion 1a presses the pawl portions 35 of the first elastic pieces 33 from the inside to bend and expand the first elastic pieces 33 outward. Then, when the flange portion 1a gets in the concave portions 36 of the pawl portions 35, the first elastic pieces 33 elastically return, and the pawl portions 35 get engaged with the flange portion 1a, whereby the first pipe member 1 is connected with the first retainer 30 as shown in FIGS. 5A and 5B. At the same time, the distal end of the first pipe member 1 is inserted into the inner periphery of the second seal ring 52, and the gap between the inner periphery of the second retainer 40 and the outer periphery of the distal end of the first pipe member 1 is sealed with the second seal ring 52 (see FIGS. 2, 3, and 5). The gap between the inner periphery of the housing 20 and the outer periphery of the second retainer 40 is sealed with the first seal ring 51 (see FIGS. 2 and 3).

As described above, the pipe fitting 10 provides simple manipulation for connecting the second pipe member 2, the first pipe member 1, and the third pipe member 3, which is connected with the first pipe member 1, with one another, and this is performed by a single touch manipulation in a way of inserting and pushing the first pipe member 1 in the insertion portion 23 of the housing 20 (see FIGS. 5A and 5B).

Then, when the first pipe member 1 is pulled in the pull-out direction from the insertion portion 23 of the housing 20 as shown in FIGS. 6A and 6B in a state where the first pipe member 1 is connected with the first retainer 30, while the first retainer 30 moves toward the opening of the insertion portion 23, the outer tapered surfaces 36a of the pawl portions 35 of the first elastic pieces 33 get engaged with the rims of the engagement concave portions 27 of the housing 20 on the side of the insertion portion 23 (see FIG. 6B) to regulate the outward expansion of the first elastic pieces 33. Thus, disengagement between the flange portion 1a of the first pipe member 1 and the pawl portions 35 of the first elastic pieces 33 can be prevented, which can keep the connected state between the first pipe member 1 and the first retainer 30.

Figure 9A:
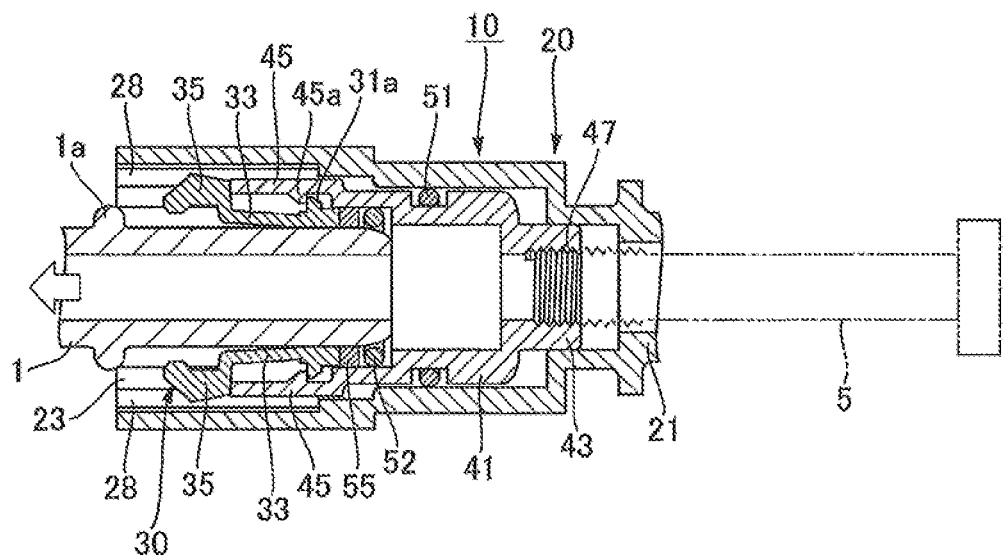
FIGS. 9A and 9B are views of the pipe fitting showing a sixth usage state thereof.
Figure 9B:
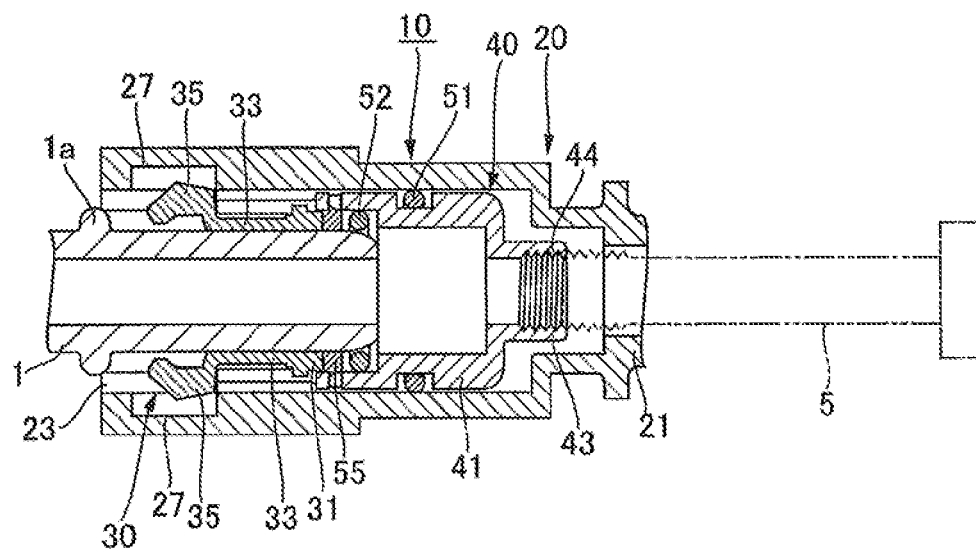

In the pipe fitting 10, when the first retainer 30 moves toward the connection portion 21 of the housing 20, the outer tapered surfaces 36a of the pawl portions 35 of the first elastic pieces 33 get separated from the rims of the engagement concave portions 27 of the housing 20, which makes the first elastic pieces 33 expandable (see FIGS. 9A and 9B). However, when the first pipe member 1 is pulled in the pull-out direction from the insertion portion 23 of the housing 20, the outer tapered surfaces 36a of the pawl portions 35 of the first elastic pieces 33 get engaged again with the rims of the engagement concave portions 27 of the housing 20 on the side of the insertion portion 23 (see FIG. 6B), whereby outward expansion of the first elastic pieces 33 is regulated.

As described above, since the first retainer 30 is configured not to be manipulated from the outside of the housing 20 while the first retainer 30 can be moved toward the connection portion 21 only through the opening 22 of the connection portion 21 of the housing 20 with the use of the manipulation cylindrical portion 43 that defines the manipulation construction, inadvertent disconnection of the pipe fitting 10 can be prevented, whereby the connected first pipe member 1 and second connected member 2 can be reliably prevented from being disconnected from each other.

For the purpose of a maintenance or component replacement, the following manipulation is performed when the first pipe member 1 or the third pipe member 3 connected with the first pipe member 1 need to be removed from the pipe fitting 10 with which the second pipe member 2 is connected.

First, a portion of the second pipe member 2 that is close to the connection portion 21 of the housing 20 is cut off with the use of a cutting tool such as scissors or a cutter, and the distal end of the manipulation tool 5 is inserted to the opening that is thus made by cutting the connection portion 21. Then, the distal end of the manipulation tool 5 is screwed into the thread groove 44 of the manipulation cylindrical portion 43 through the opening 22 of the connection portion 21 of the housing 20 (see FIGS. 7A and 7B). Then, the second retainer 40 is pushed in toward the insertion portion 23 of the housing 20 with the use of the manipulation tool 5 in this state, the base ends of the second elastic pieces 45 of the second retainer 40 get separated from the interior wall of the housing 20, which makes the second elastic pieces 45 bendable. When the second retainer 40 is further pushed in, the engagement protrusions 45a of the second elastic pieces 45 are pressed by the engagement projections 31a of the base portion 31 of the first retainer 30 to bend the second elastic pieces 45 outward. Then, when the engagement protrusions 45a surmount the engagement projections 31a of the first retainer 30, the second elastic pieces 45 elastically return, and the engagement protrusions 45a get engaged with the engagement projections 31a of the first retainer 30, whereby the second retainer 40 can be connected with the first retainer 30 (see FIG. 7A).

Then, the second retainer 40 and the first retainer 30 are slid toward the connection portion 21 of the housing 20 with the use of the manipulation tool 5 and the manipulation cylindrical portion 43 as shown in FIGS. 8A and 8B. Then, the base portion sides of the pawl portions 35 of the first elastic pieces 33 of the first retainer 30 are brought into contact with the rims of the engagement concave portions 27 of the housing 20 on the side of the connection portion 21 to regulate further sliding of the first retainer 30. At the same time, the outer tapered surfaces 36a of the pawl portions 35 get separated from the rims of the engagement concave portions 27 on the side of the insertion portion 23, whereby the first elastic pieces 33 can be kept expandable (see FIG. 8B).

Then, the first pipe member 1 is moved in the pull-out direction from the insertion portion 23 of the housing 20 while keeping the state where the second retainer 40 and the first retainer 30 are pulled toward the connection portion 21 of the housing 20 with the use of the manipulation tool 5 as indicated by the arrows in FIG. 8B. Then, the flange portion 1a of the first pipe member 1 presses the pawl portions 35 of the first elastic pieces 33 from the inside to expand the first elastic pieces 33, and the flange portion 1a gets out of the concave portions 36 of the pawl portions 35 via the inner tapered surfaces 36b. Thus, the first pipe member 1 can be pulled out from the insertion portion 23 of the housing 20, whereby the first pipe member 1 and the third pipe member 3 connected with the first pipe member 1 can be removed from the pipe fitting 10 with which the second pipe member 2 is connected (see FIGS. 9A and 9B)

Since the retainer includes the first retainer 30 and the second retainer 40 in the present embodiment as described above, when a pull-out force is exerted on the first pipe member 1 in a state where the first pipe member 1 is connected with the second pipe member 2, the second retainer 40 is slid toward the insertion portion 23 of the housing 20 to regulate the expansion of the first elastic pieces 33, which can keep the connected state as described above. At the same time, since the first retainer 30 and the second retainer 40 is configured not to be manipulated from the outside of the housing 20 in this state, the connected first pipe member 1 and second connected member 2 can be reliably prevented from being disconnected from each other by inadvertent manipulation from the outside (see FIGS. 6A and 6B). When the connected first pipe member 1 and second connected member 2 need to be disconnected from each other because of maintenance or other reasons, the second connected member 1 is cut off, and the second retainer 40 is slid through the opening 22 of the connection portion 21 of the housing 20 with the use of the manipulation construction (see FIGS. 7A and 7B). Then, by pulling the first pipe member 1 in the pull-out direction in a state where the first retainer 30 is moved toward and held at the side of the connection portion 21 of the housing 20 via the second retainer 40 (see FIGS. 8A and 8B), the flange portion 1a of the first pipe member 1 can be disengaged from the pawl portions 35 of the first elastic pieces 33, which can smoothly disengage the first pipe member 1 from the second pipe member 2 (see FIGS. 9A and 9B).

Since the first retainer 30 is separated from the second retainer 40 in a normal state, the first retainer 30 can be held in the state of still being slidable only within a predetermined range inside the housing 20 even when, for example, the second retainer 40 adheres to the housing 20 via the seal ring 51 to be made incapable of sliding. Thus, when a pull-out force is exerted on the first pipe member 1 that is engaged with the first retainer 40 while the second retainer 40 is incapable of sliding as described above, the first retainer 30 slides toward the opening of the insertion portion 23 of the housing 20, and the outer tapered surfaces 36a of the pawl portions 35 of the first elastic pieces 33 get engaged with the rims of the engagement concave portions 27 on the side of the insertion portion 23 as shown in FIG. 6B, whereby outward expansion of the first elastic pieces 33 is regulated. Thus, the engagement state between the flange portion 1a of the first pipe member 1 and the pawl portions 35 of the first elastic pieces 33 can be maintained, which can prevent the first pipe member 1 from inadvertently falling out of the insertion portion 23 of the housing 20.

Since the gap between the inner periphery of housing 20 and the outer periphery of the second retainer 40 is sealed with the first seal ring 51 while the gap between the inner periphery of the second retainer 40 and the outer periphery of the distal end of the first pipe member 1 is sealed with the second seal ring 52 in the present embodiment as shown in FIGS. 2, 3, 5A and 5B, the retainer (the first retainer 30 and the second retainer 40 in the present embodiment) can be manipulated to be slid through the opening 22 of the connection portion 21 of the housing 20 with the use of the manipulation construction in a state where the first pipe member 1 is sealed with respect to the housing 20.

Figure 7A:
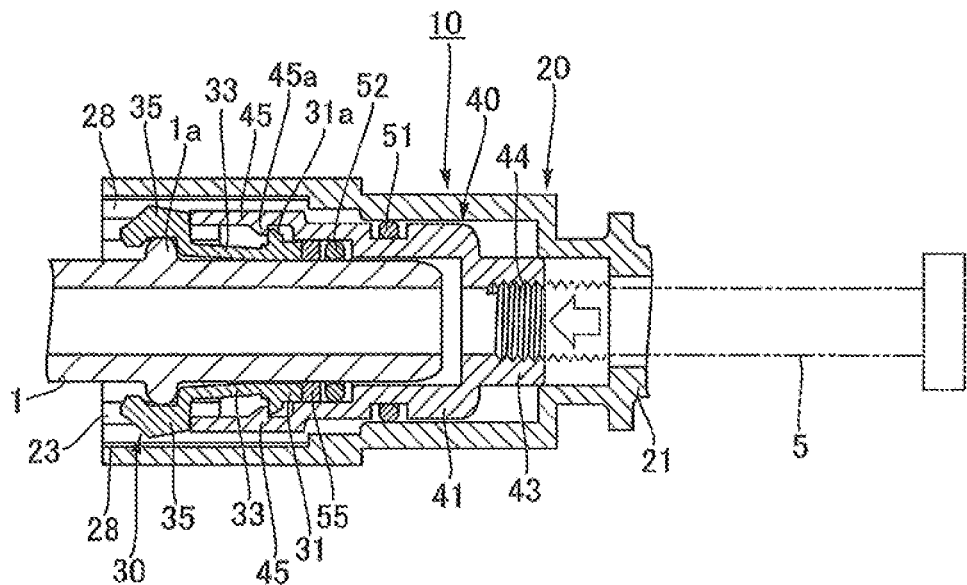
FIGS. 7A and 7B are views of the pipe fitting showing a fourth usage state thereof.
Figure 7B:
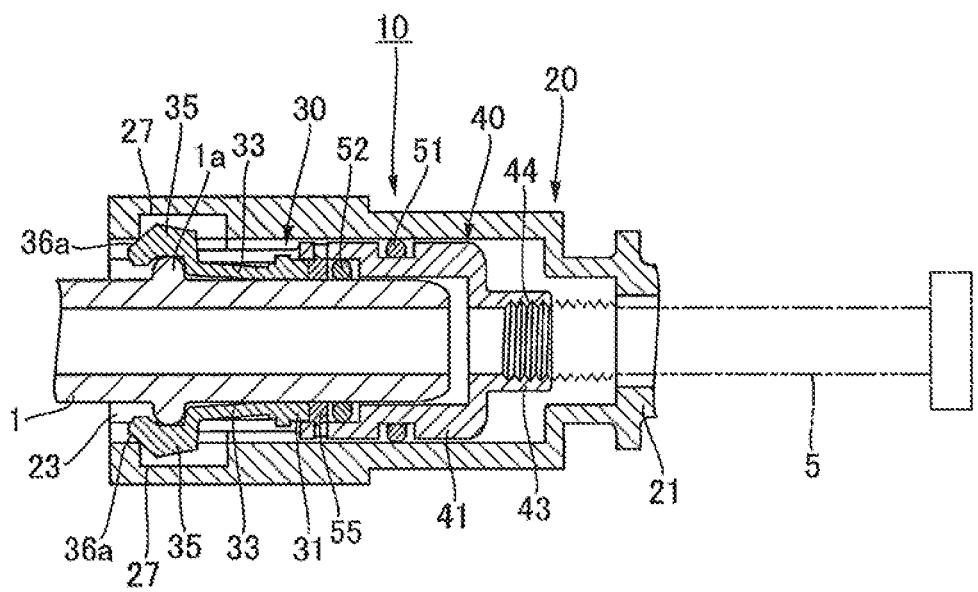

The second retainer 40 has the configuration of including the second elastic pieces 45 that are bendable and engageable with the first retainer 30 in the present embodiment, and the bending of the second elastic pieces 45 is regulated by the interior wall of the housing 20 in a normal state (see FIGS. 4A to 6B), and the second elastic pieces 45 are bent to get engaged with the first retainer 40 when the second retainer 40 is pushed in toward the first retainer 30 with the use of the manipulation construction (see FIGS. 7A and 7B). With this configuration, pushing the second retainer 40 toward the first retainer 30 through the opening 22 of the connection portion 21 of the housing 20 with the use of the manipulation construction makes the second elastic pieces 45 engaged with the first retainer 40, whereby the second retainer 40 can be connected with the first retainer 30 (see FIGS. 7A and 7B). Since the bending of the second elastic pieces 45 of the second retainer 40 is regulated by the interior wall of the housing 20 in a normal state, and the second retainer 40 is kept separated from the first retainer 30 (see FIGS. 4A to 6B), the engagement state between the first retainer 30 and the first pipe member 1 can be more reliably kept when a pull-out force is exerted on the first pipe member 1 (see FIGS. 6A and 6B).

The manipulation construction for the retainer has the configuration of being engageable with the manipulation tool 5 that is inserted into the housing 20 through the opening 22 of the connection portion 21 of the housing 20 in the present embodiment. With this configuration, inserting the manipulation tool 5 through the opening 22 of the connection portion 21 of the housing 20, for example, after cutting the second pipe member 2 connected with the connection portion 21 of the housing 20, and making the manipulation tool 5 engaged with the manipulation cylindrical portion 43 (the manipulation construction) of the second retainer 40 allows the retainer including the first retainer 30 and the second retainer 40 to be moved slidably with the use of the manipulation tool 5.

A pipe fitting according to another embodiment of the present invention is shown in FIG. 10. Constituent elements substantially same as the constituent elements in the above-described embodiment are provided with same reference numerals, and repeated descriptions of the same constituent elements are omitted.

The pipe fitting 10 according to the present embodiment includes a second retainer 40a the structure of which is different from the one in the above-described embodiment.

To be specific, the second retainer 40a includes a manipulation portion 48 extending from the manipulation cylindrical portion 43 disposed on the other end side of the main body 41, the manipulation portion 48 having a cylindrical shape reduced in diameter than the manipulation cylindrical portion 43, and the manipulation portion 48 extends beyond the opening 22 of the connection portion 21 of the housing 20 as shown in FIG. 10. The portion of the manipulation portion 48, which extends out of the opening 22 of the connection portion 21 of the housing 20, has a length enough to engage the engagement protrusions 45a of the second elastic pieces 45 of the second retainer 40a to the engagement projections 31a of the base portion 31 of the first retainer 30, when the second retainer 40a is pushed in toward the first retainer 30. The manipulation portion 48 defines the "manipulation construction" of the present invention.

The manipulation portion 48 extending from the connection portion 21 of the housing 20 is exposed by removing the second pipe member 2 from the connection portion 21 of the housing 20 in the present embodiment. Thus, the retainer including the second retainer 40 and the first retainer 30 can be moved slidably by holding the manipulation portion 48 even without using a special manipulation tool as used in the above-described embodiment.

DESCRIPTION OF REFERENCE NUMERALS AND SIGNS

1 First pipe member
1a Flange portion
2 Second pipe member
5 Manipulation tool

10 Pipe fitting
20 Housing
21 Connection portion
22 Opening
23 Insertion portion
30 First retainer
33 First elastic piece
35 Pawl portion
40, 40a Second retainer
43 Manipulation cylindrical portion (Manipulation construction)
45 Second elastic piece
48 Manipulation portion (Manipulation construction)
51 First seal ring
52 Second seal ring

The invention claimed is:

1. A pipe fitting for connecting a first pipe member with a second pipe member, the first pipe member including a flange portion on its outer periphery, the pipe fitting including:
   a cylindrical-shaped housing including:
      a connection portion at its one end, the second pipe member to be connected with the connection portion;
      an insertion portion at its other end, the first pipe member to be inserted into an inner periphery of the insertion portion; and
      an engagement concave portion provided in inner peripheries of the insertion portion and extending in an axial direction of the housing; and
   a retainer mounted on the housing and arranged to retain the first pipe member,
   wherein the retainer includes at least one pair of first elastic pieces extending toward an opening of the insertion portion of the housing, and including pawl portions engageable with the flange portion of the first pipe member,
   wherein the pawl portions engages in the engagement concave portion so as to be slidable only within a predetermined range between a first position at a connection portion side of the engagement concave portion and a second position at an insertion portion side of the engagement concave portion in the axial direction,
   wherein the first elastic pieces are expandable when the pawl portions are disposed on the first position at the connection portion side within the predetermined range in the axial direction inside the engagement concave portion,
   wherein expansion of the first elastic pieces is regulated when the pawl portions are disposed on the second position at the insertion portion side within the predetermined range in the axial direction inside the engagement concave portion,
   wherein the retainer further includes a manipulation construction that is manipulatable only through an opening of the connection portion of the housing to thereby allow the pawl portion to be held at the first position at the connection portion side inside the engagement concave portion.

2. The pipe fitting of claim 1, wherein a gap between the housing and the retainer is sealed with a first seal ring, and a gap between the retainer and the first pipe member is sealed with a second seal ring.

3. The pipe fitting of claim 1, wherein the retainer further includes:
   a first retainer disposed on the insertion portion side of the housing and provided with the first elastic piece; and
   a second retainer disposed on the connection portion side of the housing and provided with the manipulation construction, and
   wherein the first retainer is separated from the second retainer in a normal state, and is connectable with second retainer when the second retainer is manipulated to slide with a use of the manipulation construction.

4. The pipe fitting of claim 3, wherein the second retainer includes a second elastic piece that is bendable and engageable with the first retainer, and
   wherein bending of the second elastic piece is regulated by an interior wall of the housing in the normal state, and the second elastic piece is bent to get engaged with the first retainer when the second retainer is pushed in toward the first retainer with the use of the manipulation construction.

5. The pipe fitting of claim 3, wherein the manipulation construction moves the first retainer toward the connection portion in the axial direction.

6. The pipe fitting of claim 1, wherein the manipulation construction of the retainer is configured to be engageable with a manipulation tool when the manipulation tool is inserted into the housing through the opening on the connection portion side of the housing.

7. The pipe fitting of claim 1, wherein the retainer includes a manipulation portion that extends beyond the connection portion of the housing to thereby function as the manipulation construction.

8. The pipe fitting of claim 1, wherein the manipulation construction of the retainer is configured to be engageable with a manipulation tool when the manipulation tool is inserted into the housing through the opening on the connection portion side of the housing.

9. The pipe fitting of claim 1, wherein the first elastic pieces are expanded while the pawl portions are disposed inside of the housing.

10. The pipe fitting of claim 1, wherein the pawl portions included in the retainer are slidable in the axial direction inside the housing.

11. The pipe fitting of claim 1, wherein a pair of engagement concave portions each comprising the engagement concave portion are provided in the inner peripheries of the insertion portion.

12. The pipe fitting of claim 1, wherein a pair of engagement concave portions, each comprising the engagement concave portion, are provided on opposing wall portions of the inner peripheries of the insertion portion.

13. The pipe fitting of claim 1, wherein the engagement concave portion longitudinally extends along the axial direction of the housing.

14. The pipe fitting of claim 1, wherein, when the first pipe member is moved in a pull-out direction in a state where the pawl portions are engaged with the flange portion of the first pipe member, and the retainer is pulled toward the insertion portion of the housing, outer tapered surfaces of the pawl portions are engaged with rims of the engagement concave portion on the side of the insertion portion, whereby expansion of the first elastic pieces is regulated.

15. The pipe fitting of claim 1, wherein, by manipulating the manipulation construction, a distance between the manipulation construction and the housing increases in a radial direction of the housing.

* * * * *